US012145205B2

(12) United States Patent
Lu et al.

(10) Patent No.: US 12,145,205 B2
(45) Date of Patent: Nov. 19, 2024

(54) ELECTRIC CIRCULAR SAW

(71) Applicant: Nanjing Chervon Industry Co., Ltd., Nanjing (CN)

(72) Inventors: Bing Lu, Nanjing (CN); Rong Wang, Nanjing (CN)

(73) Assignee: Nanjing Chervon Industry Co., Ltd. (CN)

( * ) Notice: Subject to any disclaimer, the term of this patent is extended or adjusted under 35 U.S.C. 154(b) by 300 days.

(21) Appl. No.: 17/743,767

(22) Filed: May 13, 2022

(65) Prior Publication Data

US 2022/0266361 A1 Aug. 25, 2022

Related U.S. Application Data

(63) Continuation of application No. PCT/CN2020/134885, filed on Dec. 9, 2020.

(30) Foreign Application Priority Data

Dec. 31, 2019 (CN) .......................... 201922491295.8

(51) Int. Cl.
*B23D 45/16* (2006.01)
*B23Q 11/12* (2006.01)
(52) U.S. Cl.
CPC .............. *B23D 45/16* (2013.01); *B23Q 11/12* (2013.01)
(58) Field of Classification Search
CPC ................................ B23D 45/16; B23Q 11/12
(Continued)

(56) References Cited

U.S. PATENT DOCUMENTS 5,701,676 A * 12/1997 Itoh ........................ B27G 19/04
30/388
7,380,343 B2 * 6/2008 Yoshimura ........... B23D 59/006
83/100

(Continued)

FOREIGN PATENT DOCUMENTS

CN          1496800 A      5/2004
CN     202106098 U      1/2012

(Continued)

OTHER PUBLICATIONS

ISA/CN, English translation of Int. Search Report issued on PCT application No. PCT/CN2020/134885, dated Mar. 2, 2021, 2 pages.

(Continued)

*Primary Examiner* — Omar Flores Sanchez
(74) *Attorney, Agent, or Firm* — Greenberg Traurig, LLP

(57) ABSTRACT

An electric circular saw includes a saw blade, a drive assembly, a housing, and a base plate. The drive assembly is used for driving the saw blade to rotate around a first axis. The electric circular saw further includes a dust-blowing structure. The dust-blowing structure includes a wind-blowing assembly disposed on the drive assembly, a dust-blowing portion disposed on the base plate and a wind guide portion disposed between the dust-blowing portion and the wind-blowing assembly. The dust-blowing portion includes a flow guide hole and a flow guide groove disposed on the base plate. The flow guide hole is a through hole extending through the base plate. The flow guide groove is a groove disposed on the lower side of the base plate. The flow guide hole communicates with the flow guide groove.

19 Claims, 19 Drawing Sheets

(58) Field of Classification Search
USPC .......................................................... 30/388
See application file for complete search history.

(56) References Cited

U.S. PATENT DOCUMENTS

| | | | | |
|---|---|---|---|---|
| 7,628,102 | B2* | 12/2009 | Kamiya | B23D 59/006 |
| | | | | 83/100 |
| 11,077,507 | B1* | 8/2021 | Matson | B27G 19/04 |
| 11,639,009 | B2* | 5/2023 | Okouchi | B23D 59/006 |
| | | | | 30/388 |
| 2004/0107584 | A1* | 6/2004 | Yoshida | B23D 59/006 |
| | | | | 30/388 |
| 2005/0262706 | A1* | 12/2005 | Yoshida | B23Q 11/005 |
| | | | | 30/388 |
| 2011/0214546 | A1* | 9/2011 | Inayoshi | B23D 59/006 |
| | | | | 83/168 |
| 2017/0326660 | A1* | 11/2017 | Nakashima | B23D 59/002 |
| 2021/0379680 | A1* | 12/2021 | Liu | B27B 9/00 |
| 2022/0379391 | A1* | 12/2022 | Sobl | B27G 19/04 |
| 2023/0173597 | A1* | 6/2023 | Hamada | B23D 59/006 |
| | | | | 30/124 |
| 2023/0241696 | A1* | 8/2023 | Wang | B24B 55/02 |
| | | | | 83/169 |
| 2024/0033839 | A1* | 2/2024 | Kunze | B27B 9/00 |

FOREIGN PATENT DOCUMENTS

| | | |
|---|---|---|
| CN | 202137453 U | 2/2012 |
| CN | 211680290 U | 10/2020 |
| EP | 2000243 A2 | 12/2008 |
| JP | 2014161935 A | 9/2014 |

OTHER PUBLICATIONS

ISA/CN, Int. Search Report issued on PCT application No. PCT/CN2020/134885, dated Mar. 2, 2021, 4 pages.
SA/CN, English translation of Written Opinion issued on PCT application No. PCT/CN2020/134885, dated Mar. 2, 2021, 3 pages.
ISA/CN, Written Opinion issued on PCT application No. PCT/CN2020/134885, dated Mar. 2, 2021, 4 pages.

* cited by examiner

ELECTRIC CIRCULAR SAW

RELATED APPLICATION INFORMATION

This application is a continuation of International Application Number PCT/CN2020/134885, filed on Dec. 9, 2020, through which this application also claims the benefit under 35 U.S.C. § 119(a) of Chinese Patent Application No. 201922491295.8, filed on Dec. 31, 2019, all of which are incorporated herein by reference in their entirety.

BACKGROUND

An electric circular saw generally includes structures such as a saw blade, a base plate, a housing and an electric motor. To improve the cut accuracy of the electric circular saw and facilitate an operator to align a cut line during cutting, the electric circular saw further includes a guide structure for guiding the operator to cut. However, when the operator determines a cut direction through the guide structure, chips or dust generated during the cutting of the saw blade may block the operator's line of sight. In the related art, to ensure that the cut direction of the electric circular saw has a relatively clear field of view, the electric circular saw is also provided with some dust-blowing apparatuses. However, a dust-blowing apparatus in the related art has a complicated structure and occupies a large space above the base plate. As a result, the operator's field of view is blocked. At the same time, since it is necessary to mount a relatively complex guide structure, the heat dissipation of the electric motor is hindered. Thus, the service life of the electric circular saw is affected, and the use cost is also increased. At present, it is urgent to solve the technical problem of how to provide a dust-blowing structure having a simple structure and a good dust-blowing effect.

SUMMARY

In an example, an electric circular saw includes a saw blade, a shield, a drive assembly, a housing and a base plate. The saw blade is used for cutting a workpiece. At least part of the shield encloses the saw blade. The drive assembly is used for driving the saw blade to rotate around a first axis. The housing forms an accommodation space for accommodating the drive assembly. The base plate is configured to be mounted with the housing and the shield. The electric circular saw further includes a dust-blowing structure. The dust-blowing structure includes a wind-blowing assembly disposed on the drive assembly, a dust-blowing portion disposed on the base plate and a wind guide portion disposed between the dust-blowing portion and the wind-blowing assembly. The dust-blowing portion includes a flow guide hole and a flow guide groove disposed on the base plate. The flow guide hole is a through hole extending through the base plate. The flow guide groove is a groove disposed on the lower side of the base plate. The flow guide hole communicates with the flow guide groove.

In one example, the drive assembly includes an electric motor and a gearbox for securing the electric motor. The gearbox is provided with an opening for the wind-blowing assembly to blow out a heat dissipation wind through.

In one example, the gearbox is further provided with a connection portion for being secured to the base plate. The connection portion is disposed on the side of the dust-blowing portion facing away from the shield. At least part of the connection portion can divide the upper space of the base plate.

In one example, the wind guide portion is disposed at the opening and is provided with a guide rib for guiding the heat dissipation wind.

In one example, the base plate includes a base plate plane extending in a first plane. In a first straight line parallel to the first plane and perpendicular to a first axis, the wind guide portion and the dust-blowing portion are substantially located on two sides of the first straight line.

In one example, the base plate includes a base plate plane extending in the first plane. In a plane parallel to the first plane, the guide rib substantially extends in a second straight line. In a plane parallel to the first axis, the guide rib substantially extends in a third straight line. In the first straight line parallel to the first plane and perpendicular to the first axis, the first straight line and the second straight line intersect and form an included angle, and the included angle is greater than or equal to 5° and less than or equal to 50°; and the first straight line and the third straight line intersect and form an included angle, and the included angle is greater than or equal to 5° and less than or equal to 50°.

In one example, the base plate includes a base plate plane extending in the first plane. In a plane parallel to the first plane, the guide rib substantially extends in the second straight line. In a plane parallel to the first axis, the guide rib substantially extends in the third straight line. In a first straight line parallel to the first plane and perpendicular to the first axis, the first straight line and the second straight line intersect and form an included angle, and the included angle is greater than or equal to 15° and less than or equal to 25°; and the first straight line and the third straight line intersect and form an included angle, and the included angle is greater than or equal to 15° and less than or equal to 25°.

In one example, the electric circular saw further includes a guide portion for guiding a cut direction. The dust-blowing portion is disposed on the rear side of the guide portion.

In one example, the width of the flow guide hole in a left-right direction has the same dimension as the width of the flow guide groove in the left-right direction.

In one example, the depth of the flow guide groove in an up-down direction is greater than or equal to 0.5 mm and less than or equal to 5 mm.

In one example, the electric circular saw further includes a handle connected to the housing. The handle includes a primary handle and a secondary handle. The secondary handle is detachably connected to the housing. The secondary handle includes a base portion and an outer cover portion. The outer cover portion is directly formed on the outer surface of the base portion and covers the outer surface.

In one example, the electric circular saw further includes a locking bolt for detachably connecting the secondary handle to a support portion disposed on the housing.

In one example, the support portion is provided with a threaded hole. The secondary handle is provided with a countersunk hole. The locking bolt extends through the countersunk hole and is threadedly connected to the threaded hole.

In one example, one side of the secondary handle is provided with a mounting groove. The support portion can be insertable into the mounting groove.

In one example, the outer cover portion is made of an elastic material.

In one example, the outer cover portion and the base portion are integrally formed by injection molding.

In one example, the outer surface of the base portion is provided with a plurality of grooves. The inner surface of the outer cover portion is provided with protrusions insertable into the grooves.

In one example, the secondary handle is T-shaped and has a grip portion and a connection portion that are vertically connected. The connection portion is detachably connected to the housing. The grip portion is provided with a through cavity extending through two ends of the grip portion.

In one example, the secondary handle extends along an extension axis and away from the primary handle. The extension axis is disposed at an included angle with the center line of a motor shaft.

In one example, the included angle between the extension axis and the center line of the motor shaft is greater than or equal to 5° and less than or equal to 10°.

DETAILED DESCRIPTION

Figure 1:
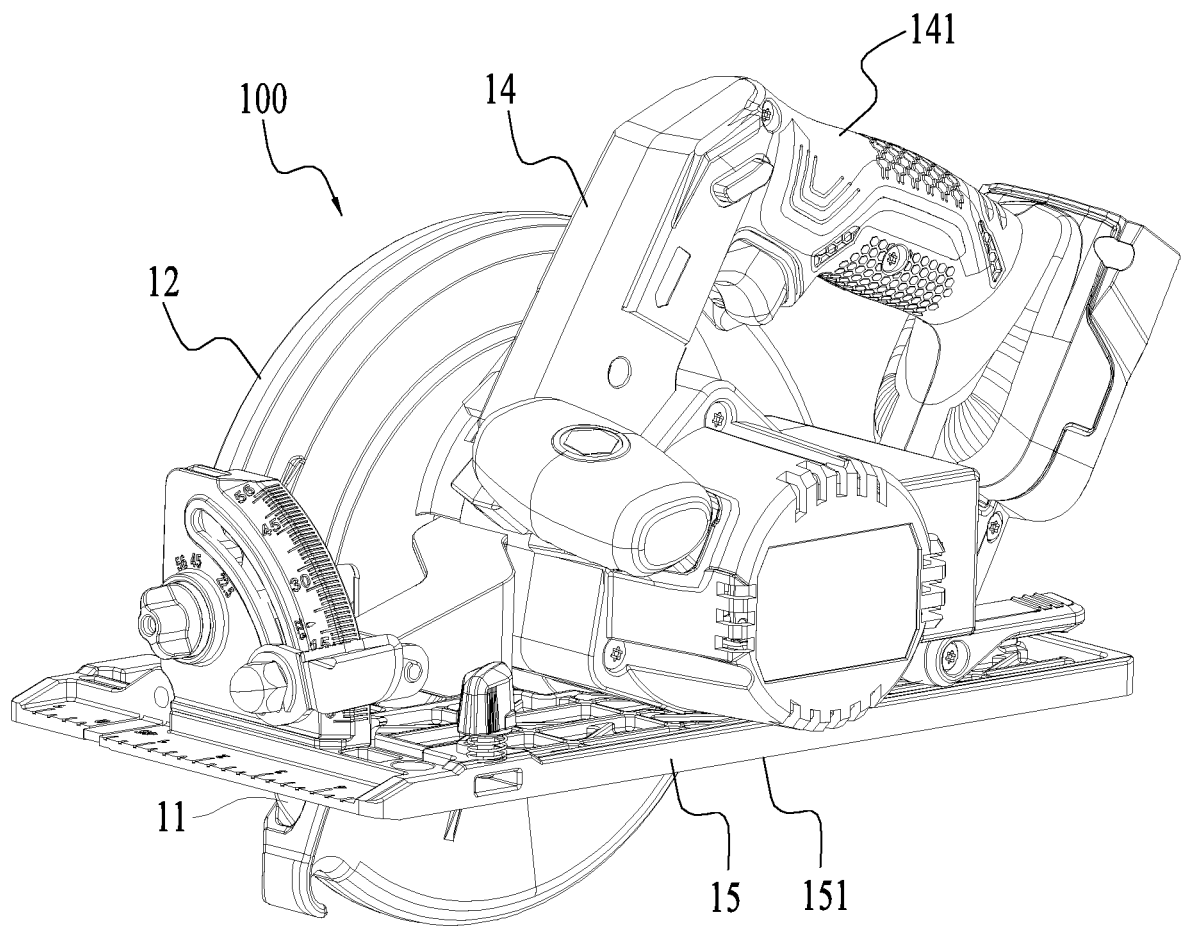
FIG. 1 is a perspective view of an electric circular saw.

FIGS. 1 to 4 illustrate an electric circular saw 100 for cutting a workpiece. The electric circular saw 100 includes a saw blade 11, a shield 12, a drive assembly 13, a housing 14 and a base plate 15. The housing 14 is provided with an accommodation space for accommodating at least part of the drive assembly 13 and a handle portion 141 for holding. In an implementation, the housing 14 is further provided with a coupling portion 142 for connecting a battery pack. The battery pack is used for supplying power to the drive assembly 13. Thus, the saw blade 11 is driven to rotate to cut the workpiece. Optionally, the housing 14 may further be provided with a wiring terminal for connecting an alternating current power supply, and the details are not repeated here. Any energy source that can provide energy to the drive assembly 13 and enable the drive assembly 13 to drive the saw blade 11 to rotate may be used. The drive assembly 13 includes an electric motor 131 used for outputting a drive force, a transmission assembly 13a for transmit a power between the electric motor 131 and the saw blade 11, and a gearbox 132 for accommodating at least a portion of the electric motor 131 and the transmission assembly 13a. The saw blade 11 can be driven by the electric motor 131 to rotate around a first axis 101. Thus, a cut function is achieved. At least part of the shield 12 encloses the saw blade 11 to prevent the saw blade 11 from being exposed to the outside in a non-cut state. The base plate 15 is provided with a base plate plane 151 in contact with the workpiece, and the base plate plane 151 extends in a first plane 102. A plane where the baseplate plane 151 is located is parallel to the first axis 101. In an implementation, when a user needs to adjust the included angle between the base plate 15 and the saw blade 11 and cut the workpiece at a preset angle, the plane where the base plate plane 151 is located may also intersect the first axis 101.

Figure 2:
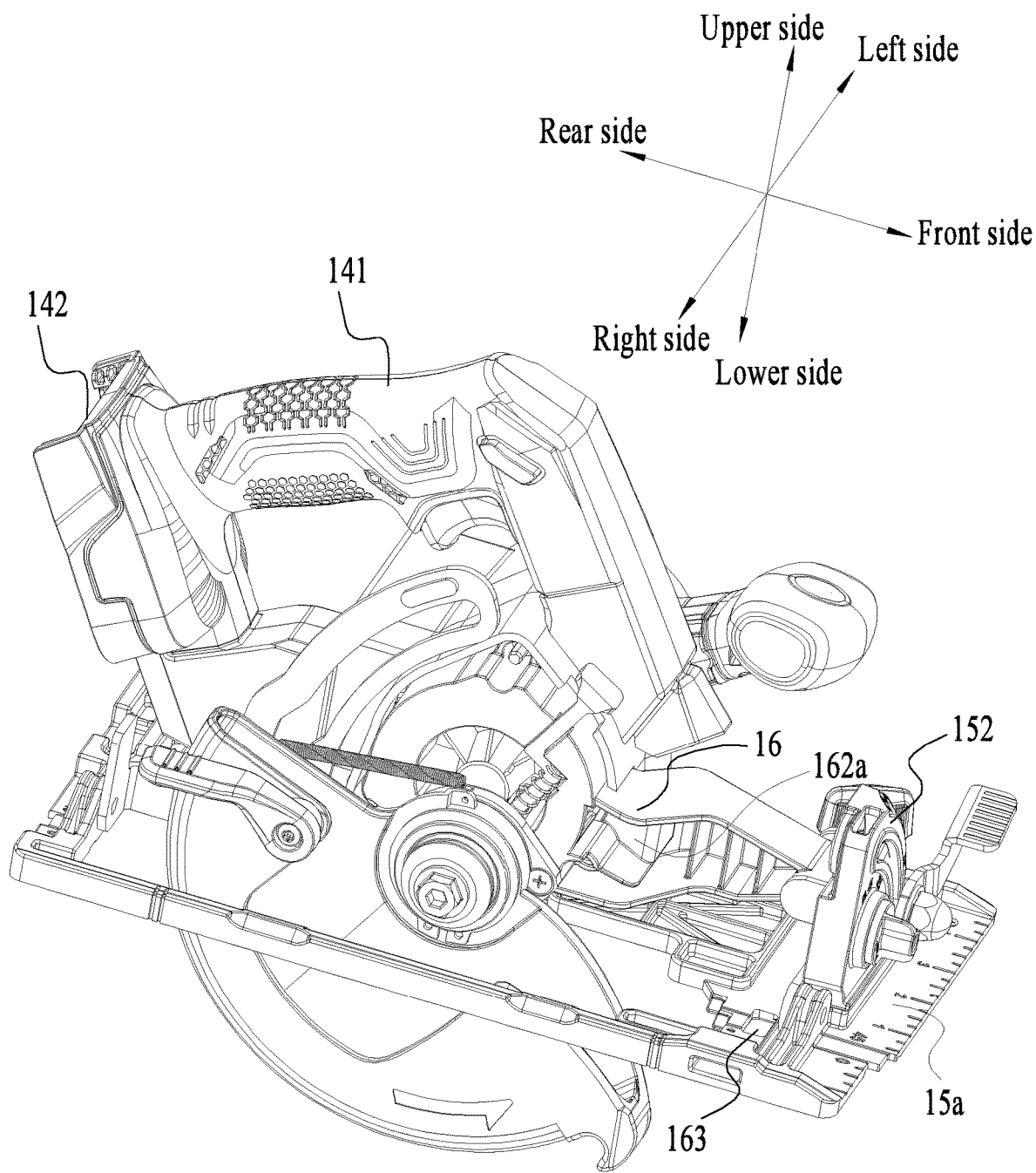
FIG. 2 is a perspective view of the electric circular saw of FIG. 1 with a part of a shield and a part of a saw blade removed.
Figure 3:
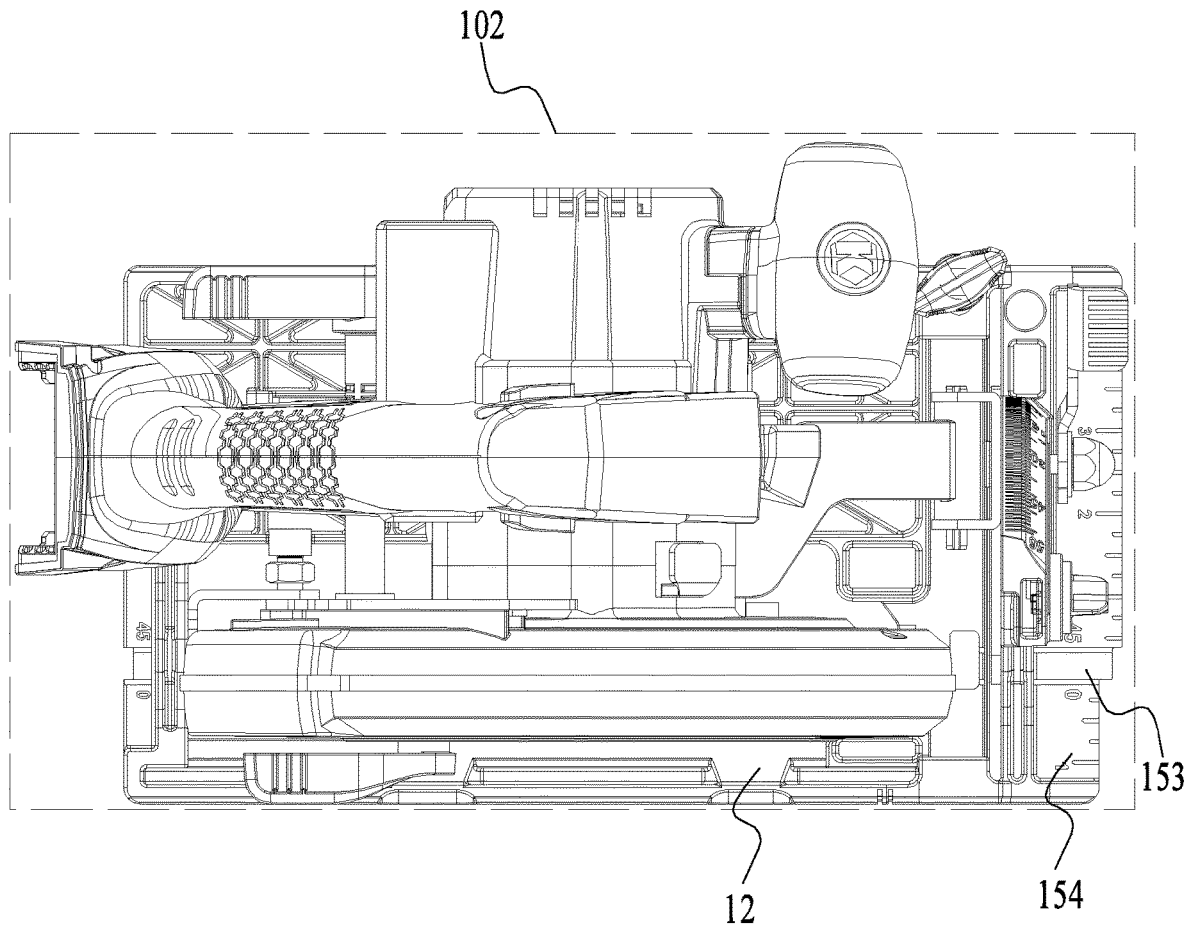
FIG. 3 is a top view of the electric circular saw of FIG. 1.
Figure 4:
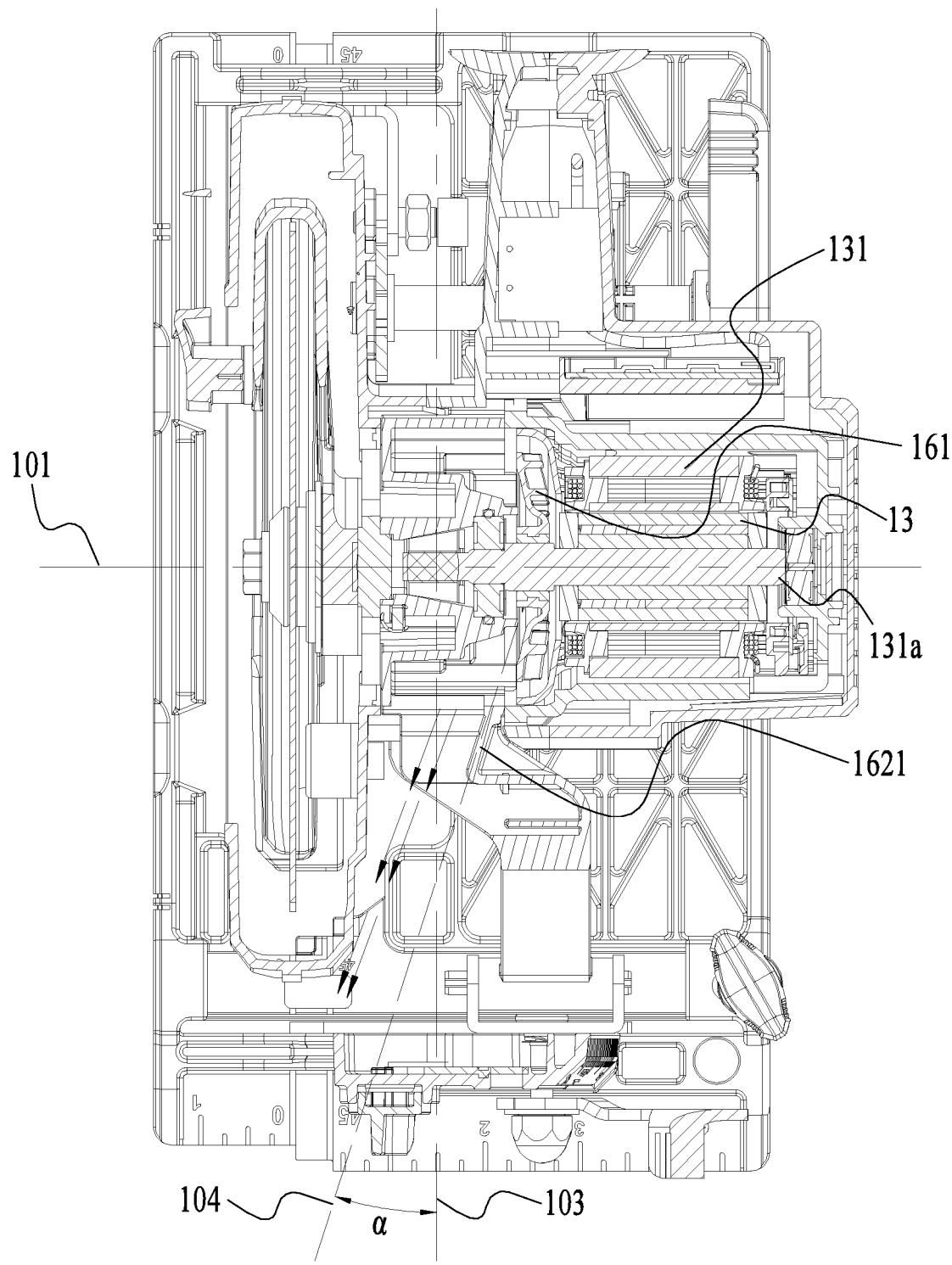
FIG. 4 is a cross-sectional view of the electric circular saw of FIG. 1.
Figure 5:
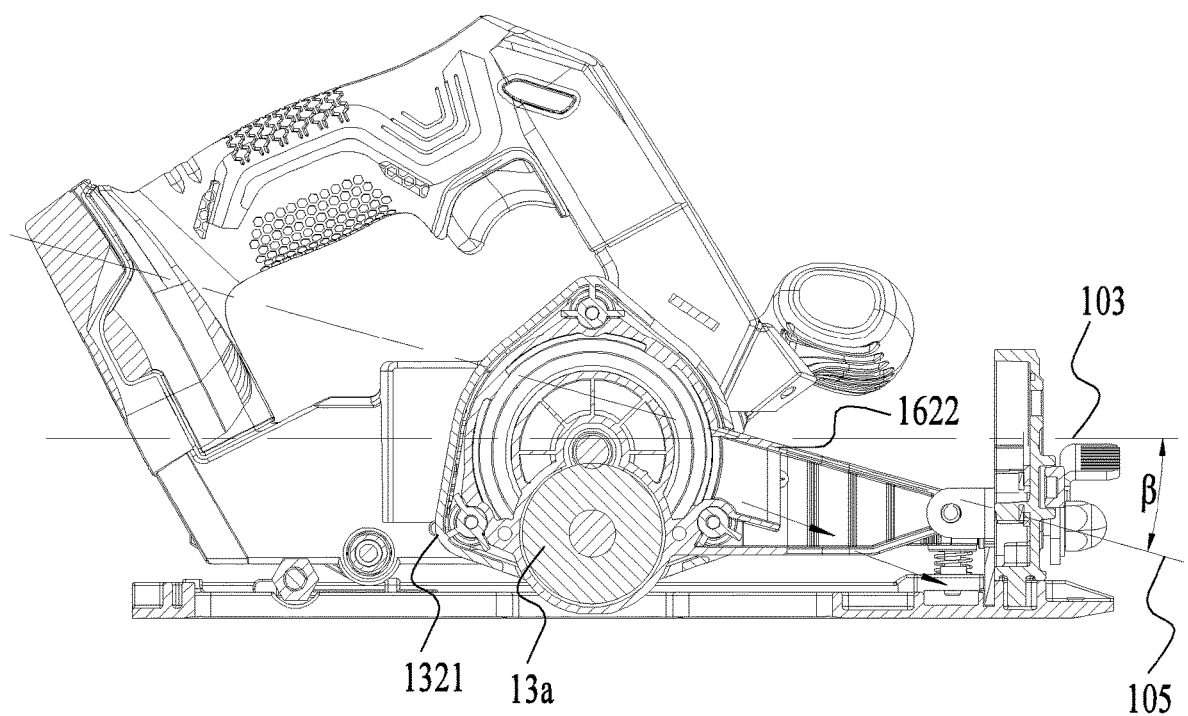
FIG. 5 is a sectional view of another position of the electric circular saw of FIG. 1.
Figure 6:
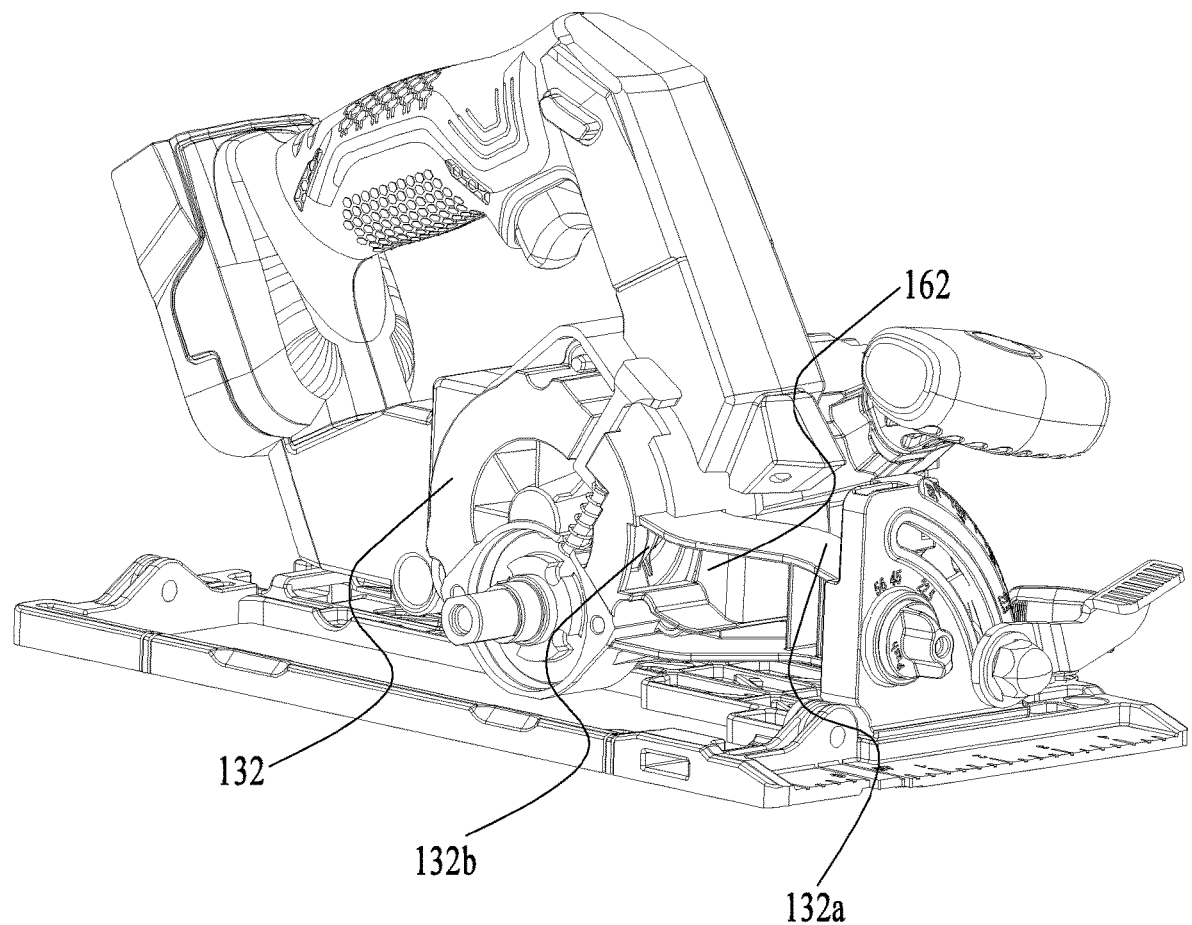
FIG. 6 is a perspective view of the electric circular saw of FIG. 1 with the entire shield removed, that is, the entire saw blade removed.
Figure 7:
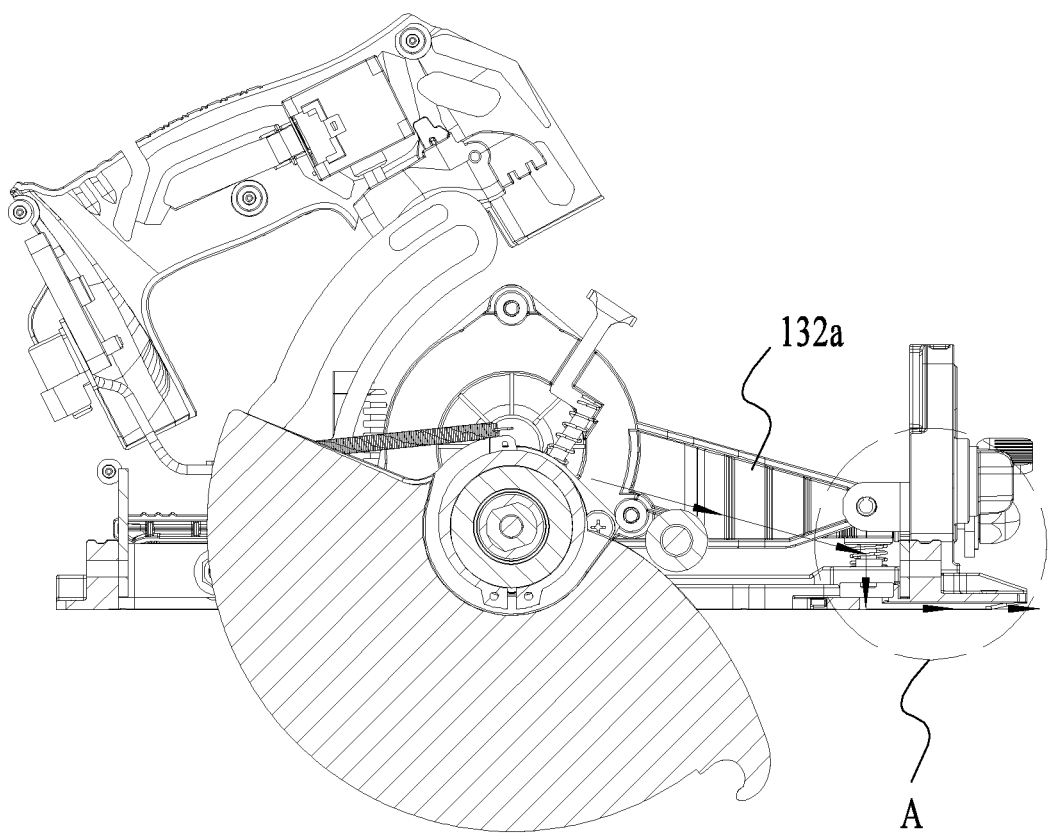
FIG. 7 is a section view of the electric circular saw of FIG. 1.
Figure 8:
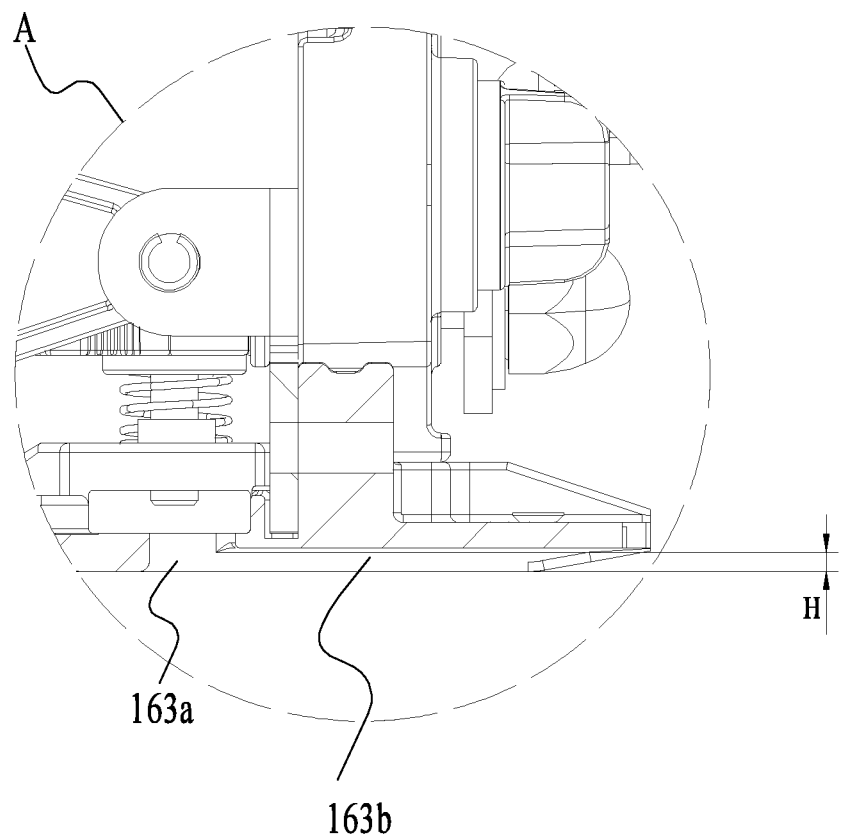
FIG. 8 is a partial enlarged view of part A of the electric circular saw of FIG. 7.
Figure 9:
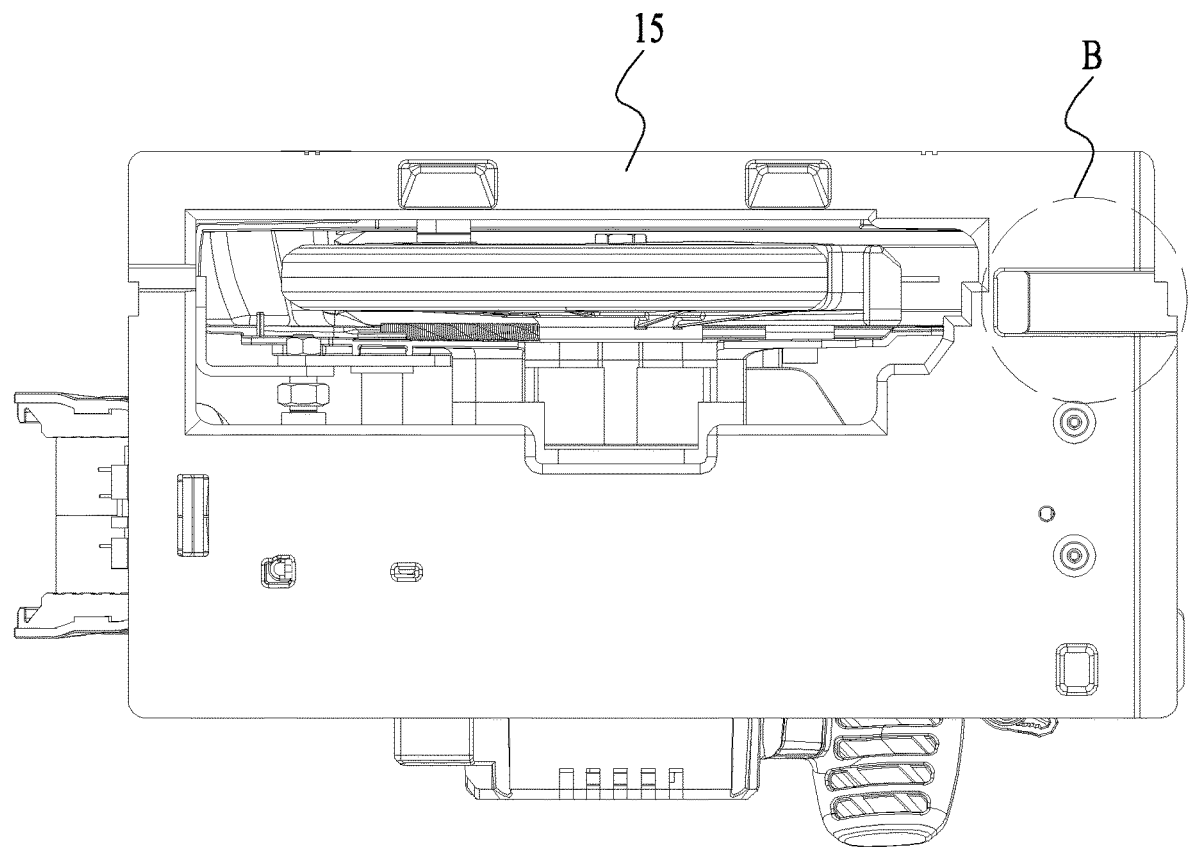
FIG. 9 is a bottom view of the electric circular saw of FIG. 1.
Figure 10:
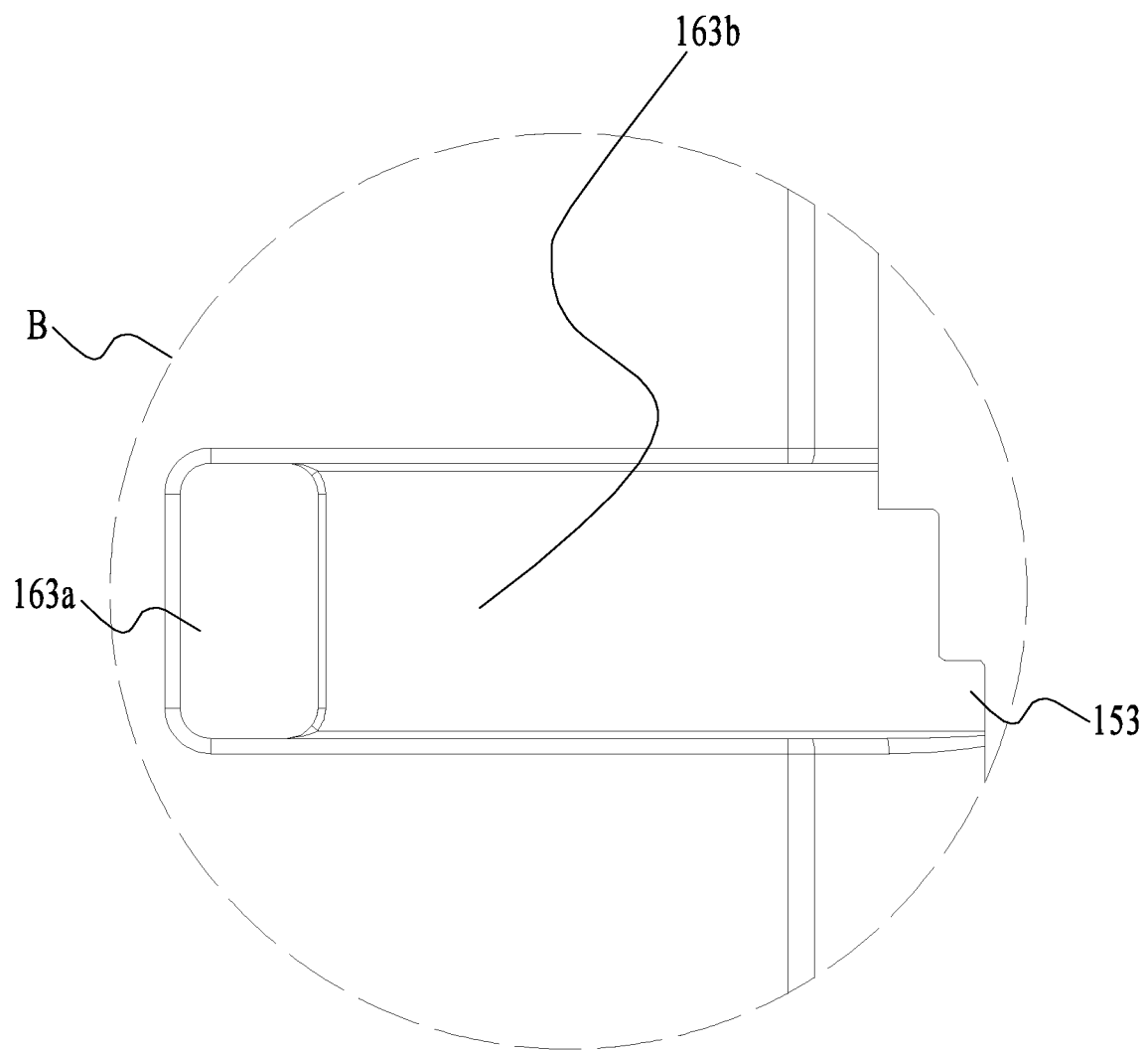
FIG. 10 is a partial enlarged view of part B of the electric circular saw of FIG. 9.

To facilitate the description of technical solutions in the present application, a front side, a rear side, an upper side, a lower side, a left side and a right side shown in FIG. 2 are further defined. The drive assembly 13 is disposed on the upper side of the base plate 15. The base plate 15 is provided with a channel through which the saw blade 11 may extend. The base plate 15 is further provided with an adjustment mechanism 152 for adjusting a cut angle. The adjusting mechanism 152 is used to adjust the cut angle of the saw blade 11. Specifically, as shown in FIGS. 2 and 3, the adjustment mechanism 152 is disposed on the front side of the base plate 15. The first plane 102 extends in a left-right direction shown in the figure. The base plate 15 is further provided with a guide portion 153 and a dial 154 matched with the adjustment mechanism 152. The guide portion 153 extends in a front-rear direction and is secured to or integrally formed with the base plate 15. The guide portion 153 is substantially parallel to the saw blade 11 and is disposed at the front side of the saw blade 11. In some optional examples, the guide portion 153 and the saw blade 11 are both arranged in a straight line extending in the front-rear direction. The guide portion 153 is arranged on an upper surface 15a of the base plate 15. With this provision, the user may cut the workpiece in a designated range or on a preset marker line under the direction of the guide portion 153 without observing the saw blade 11. When the user cuts the workpiece, due to the cut action of the saw blade 11, a lot of chips or dust may be generated at the front end of the guide portion 153. The chips or dust that accumulates on a marker line or the front end of the guide portion 153 may stop the user's line of sight. As a result, the accuracy of the user's cut is affected. For this reason, in this example, a dust-blowing structure 16 is also disposed. The dust-blowing structure 16 may blow away the chips or dust near the guide portion 153. In this manner, the to-be-cut part at the front end of the saw blade 11 is always kept clean. Thus, the visibility of the electric circular saw 100 under a cut state is increased, and cut accuracy is optimized.

Specifically, as shown in FIGS. 2 to 6, the dust-blowing structure 16 includes a wind-blowing assembly 161, a wind guide portion 162 and a dust-blowing portion 163. The wind-blowing assembly 161 rotates under the drive of the electric motor 131 to form a heat dissipation wind. The wind guide portion 162 can guide the heat dissipation wind from the electric motor 131 to the dust-blowing portion 163 and further guide the heat dissipation wind to the guide portion 153 or the front side of the guide portion 153 under the action of the dust-blowing portion 163. The chips or dust at the front end of the guide portion 153 is blown away. In an implementation, the wind-blowing assembly 161 includes a fan. The fan is disposed on an output shaft 131a of the electric motor 131. When the electric motor 131 rotates, the fan is driven to rotate synchronously. Thus, the heat dissipation wind is formed. The wind guide portion 162 is disposed on the right side of the wind-blowing assembly 161. In an implementation, the wind guide portion 162 is disposed on the gearbox 132. The gearbox 132 is configured to be mounted with and secure the electric motor 131 and related accessories. Specifically, the gearbox 132 includes an accommodating portion 1321 for accommodating the at least the portion of the electric motor 131 and the transmission assembly 13a, and the gearbox 132 further includes a connection portion 132a connected to the base plate 15. The connection portion 132a connects the accommodating portion 1321 and the adjustment mechanism 152. The gearbox 132 is further provided with an opening 132b. The wind guide portion 162 is disposed at the opening 132b. The opening 132b enables a heat dissipation wind flow blown out by the wind-blowing assembly 161 to be blown out and guided to the dust-blowing portion 163. Specifically, the wind guide portion 162 includes a guide rib 162a for guiding the heat dissipation wind directly to the dust-blowing portion 163. The wind guide portion 162 is disposed on the left side of the dust-blowing portion 163. In the left-right direction in the figure, the wind guide portion 163 and the dust-blowing portion 163 have a certain distance. Alternatively, in a first straight line 103 extending in the front-rear direction, the wind guide portion 162 and the dust-blowing portion 163 are substantially located on two sides of the connection portion 132a. The first straight line 103 is parallel to the first plane 102 and is perpendicular to the first axis 101. The wind guide portion 162 is arranged on the connection portion 132a. The straight line 103 is parallel to the base plate plane 151 and is perpendicular to the first axis 101. To enable the opening 132b to guide the heat dissipation wind directly to the dust-blowing portion 163, in a plane parallel to the first plane 102, the guide rib 162a substantially extends in a second straight line 104 parallel to the base plate plane 151, and the first straight line 103 and the second straight line 104 intersect and form an included angle α; and when the guide rib 162a is in a plane perpendicular to the first axis 101, the guide rib 162a substantially extends in a third straight line 105, and the first straight line 103 and the third straight line 105 intersect and form an included angle β. When the included angle α is greater than or equal to 5° and less than or equal to 50°, and the included angle β is greater than or equal to 5° and less than or equal to 50°, the guide rib 162a can preferably direct the heat dissipation wind in a wind guide cover to the dust-blowing portion 163. Further, when the included angle α is greater than or equal to 15° and less than or equal to 25°, and the included angle β is greater than or equal to 15° and less than or equal to 25°, the guide effect of the guide rib 162a is better.

The guide rib 162a includes a first guide surface 1621 extending along the second straight line 104, the second straight line 104 is parallel to the base plate plane 151, and the first straight line 103 and the second straight line 104 intersect and form an included angle α. That is to say, the first guide surface 1621 extends along a plane perpendicular to the base plate plane 151 and intersecting the first straight line 103 obliquely to form the angle α. So the first guide surface 1621 guides the heat dissipation wind to flow to the right.

The guide rib 162a further includes a second guide surface 1622 extending along the third straight line 105, the third straight line 105 is perpendicular to the first axis 101, and the first straight line 103 and the third straight line 105 intersect and form an included angle β. That is to say, the second guide surface 1622 extends along a plane parallel to the first axis 101 and intersecting the first straight line 103 obliquely to form the angle β. So the second guide surface 1622 guides the heat dissipation wind to flow downward.

The dust-blowing portion 163 is arranged at the right side of the opening 132b and at the lower side of the opening 132b. The first guide surface 1621 and the second guide surface 1622 work together to guide the heat dissipation wind to the dust-blowing portion 163. That is to say, the first guide surface 1621 and the second guide surface 1622 define a guide channel for guiding the heat dissipation wind to the dust-blowing portion 163.

Additionally, one end of the connection portion 132a is connected to the gearbox 132, and another end is disposed adjacent to the adjustment mechanism 152. The connection portion 132a is disposed on the left side of the dust-blowing portion 163. The connection portion 132a can effectively separate the space on the left side of the shield 12. Thus, a relatively small space is formed between the shield 12 and the connection portion 132a. In this manner, the heat dissipation wind blown out from the opening 132b is more concentrated, and the heat dissipation wind is prevented from flowing in an open space. Therefore, dust-blowing efficiency is effectively increased.

As shown in FIG. 2 and FIGS. 7 to 10, the dust-blowing portion 163 is disposed on the rear side of the guide portion 153 and is substantially parallel to the guide portion 153. In this example, the dust-blowing portion 163 includes a flow guide hole 163a and a flow guide groove 163b. The flow guide hole 163a is a through hole extending through the base plate 15. The flow guide groove 163b is a groove disposed on the lower side of the base plate 15 and extends from the flow guide hole 163a to an edge of the front end of the base plate 15. The guide groove 163b has a smooth and continuous surface and communicates with the guide hole 163a. It is to be understood that the base plate 15 is provided with the flow guide hole 163a and the flow guide groove 163b to effectively reduce the complexity of the dust-blowing structure 16. In an implementation, the flow guide hole 163a and the flow guide groove 163b are a through hole and a groove disposed on the existing base plate 15, and no separate guide structure or guide structure is required. Thus, not only a wind-blowing structure is simplified, but also the provision of a complex guide structure or guide structure that affects operator's visibility during operation is avoided. Moreover, other structures mounted on the gearbox 132 are prevented from affecting the heat dissipation efficiency of the electric motor 131. At the same time, manufacturing costs are effectively reduced, and materials are saved.

In an implementation, the guide portion 153 is disposed in a space where the flow guide groove 163b is located. In a straight line perpendicular to the base plate plane 151, the flow guide groove 163b has a projection in the base plate plane 151. The guide portion 153 is disposed in the range of this projection to enable the chips and dust at the front end of the guide portion 153 to be blown off. In an implementation, the flow guide groove 163b has a length in the front-rear direction, a width in the left-right direction and a depth in an up-down direction. The width of the flow guide hole 163a in the left-right direction has the substantially same dimension as the width of the flow guide groove 163b in the left-right direction. Thus, the heat dissipation wind flowing into the flow guide hole 163a is relatively concentrated and converged into the flow guide groove 163b. The depth of the flow guide groove 163b in the up-down direction has a preset value to enable the heat dissipation wind to be effectively blown out. At the same time, it is also avoided that the heat dissipation wind disperses too quickly due to an excessive depth, which affects wind-blowing efficiency. Specifically, the depth H of the flow guide groove 163b in the up-down direction is greater than or equal to 1 mm and less than or equal to 5 mm.

When an operator operates the electric circular saw 100 to cut the workpiece, a cut line may be aligned by the guide portion 153 and a cut operation may be performed at a designated position. Before the saw blade 11 contacts the workpiece, the heat dissipation wind generated by the wind-blowing assembly 161 and the wind generated when the saw blade 11 rotates may simultaneously be blown towards the front side of the saw blade 11. When the saw blade 11 comes into contact with the workpiece, the heat dissipation wind generated by the wind-blowing assembly 161 and the wind generated when the saw blade 11 rotates may simultaneously be blown to the front side of the guide portion 153, so that the cut line is clearly exposed. When the saw blade 11 cuts into the workpiece, at this time, the saw blade 11 is in the cut seam of the workpiece. As a result, the wind generated when the saw blade 11 rotates cannot be transmitted to the front side of the workpiece, or a relatively closed space is formed between the saw blade 11 and the workpiece. Thus, an air flow cannot extend through the workpiece and be blown towards the front side of the guide portion 153. At this time, the heat dissipation wind generated by the wind-blowing assembly 161 extends through the flow guide hole 163a and flows into the flow guide groove 163b under the guide action of the guide rib 162a. Thus, an air flow is generated between the base plate 15 and the workpiece to rapidly blow away the chips and dust on the front side of the guide portion 153. It is to be understood that at this time, due to the existence of the flow guide groove 163b, a gap exists between the base plate 15 and the workpiece, and the air flow is blown out from this gap. Thus, the chips and dust may be efficiently blown away.

Figure 11:
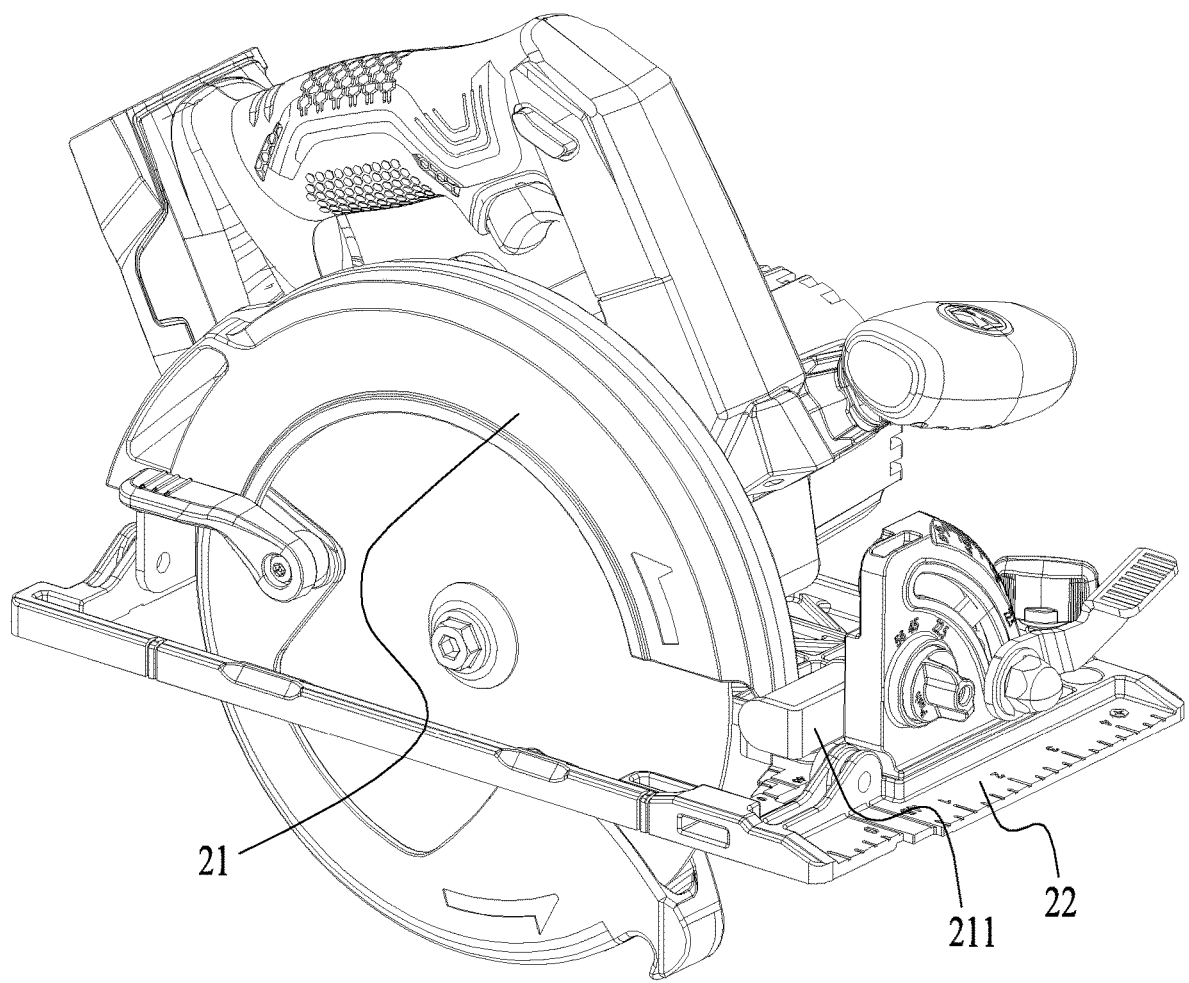
FIG. 11 is a perspective view of an electric circular saw with an entire shield removed, that is, an entire saw blade removed, according to a second example.

As shown in FIG. 11, in a second example of the present application, a shield 21 is provided with a connection portion 211 to make the shield 21 and a gearbox secured to a base plate 22. The connection portion 211 is secured to or integrally formed with the shield 21.

Figure 12:
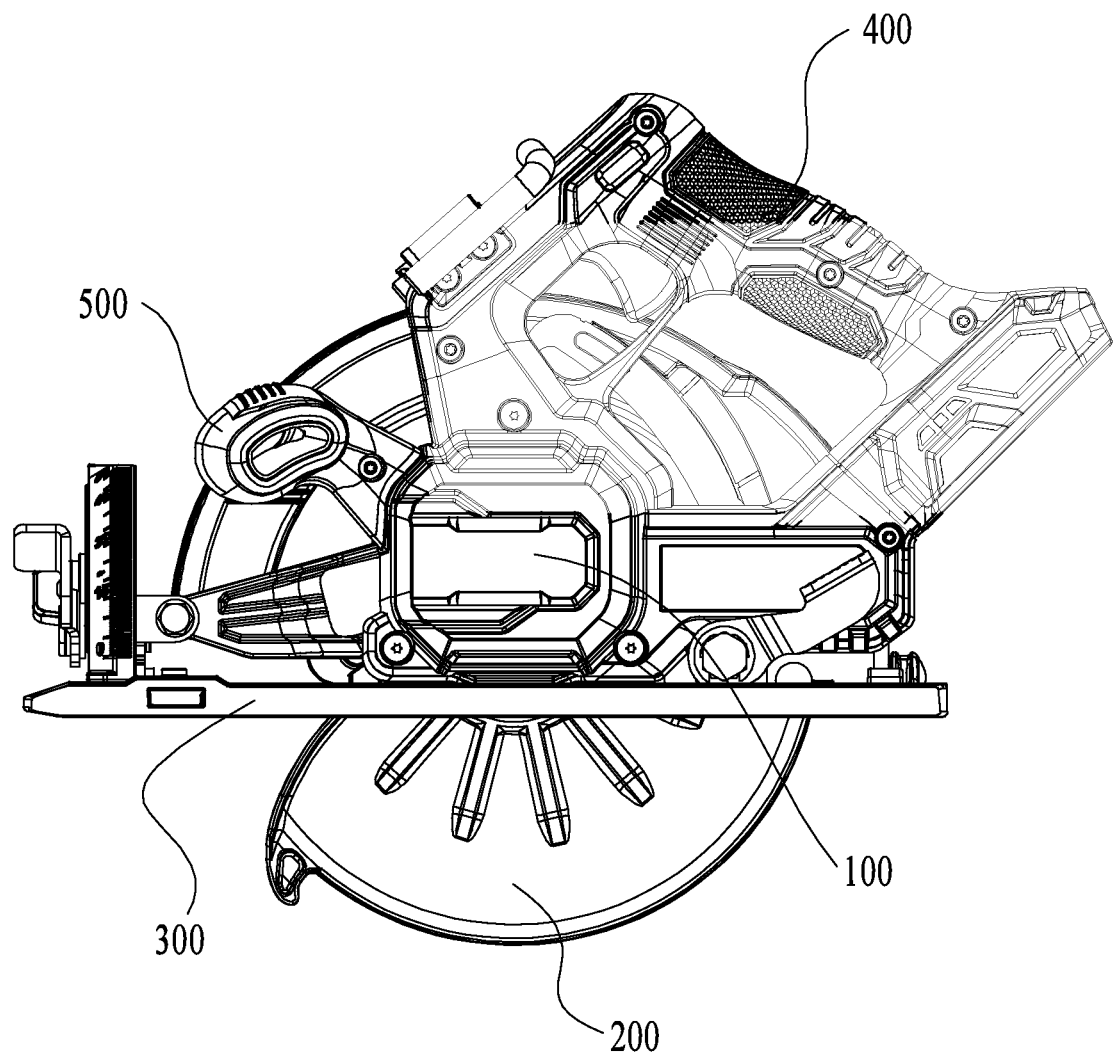
FIG. 12 is a front view of a circular saw of an electric circular saw according to a third example.

FIG. 12 shows a third example of the present application. The parts of the first example and the second example applicable to this example can be applied to this example, and differences are described below.

In this example, a handle is connected to a housing 100. The handle includes a primary handle 400 and a secondary handle 500. The primary handle 400 is connected to the upper side of the housing 100. The secondary handle 500 is connected to one side of the housing 100.

The secondary handle 500 is detachably connected to the housing 100. During production, the secondary handle 500 may be formed separately and then connected to the housing 100 to facilitate processing and production.

Figure 13:
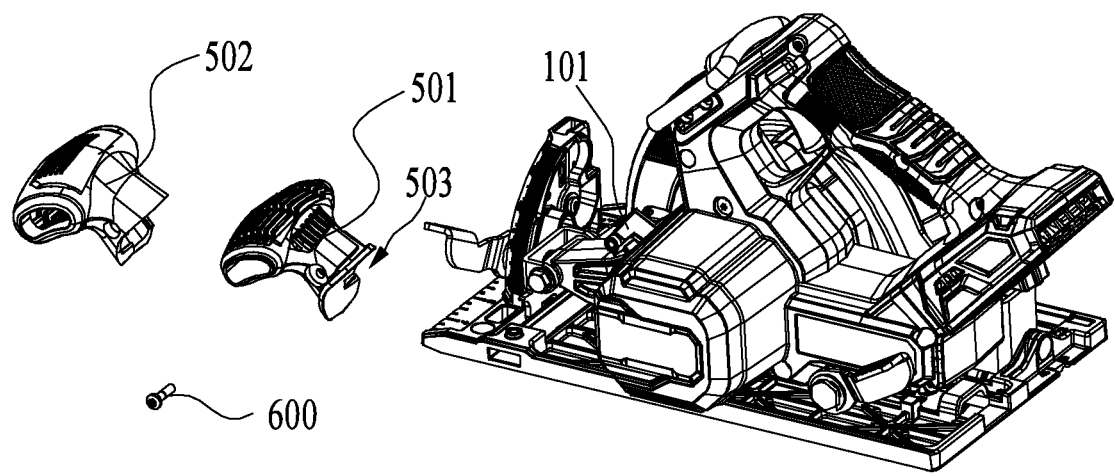
FIG. 13 is an exploded view illustrating the structure of the electric circular saw of FIG. 12.

Referring to FIG. 13, a circular saw further includes a locking bolt 600 for detachably connecting the secondary handle 500 to a support portion 101 disposed on the housing 100 to facilitate mounting and detachment. The support portion 101 and the housing 100 may be integrally formed to facilitate processing and production.

The support portion 101 is provided with a threaded hole 102. The secondary handle 500 is provided with a countersunk hole 5011. The locking bolt 600 extends through the countersunk hole 5011 and is threadedly connected to the threaded hole 102. The head of the locking bolt 600 is located in the countersunk hole 5011. Thus, the locking bolt 600 does not protrude out of the surface of the secondary handle 500. Moreover, the holding handfeel of the secondary handle 500 is not affected.

Optionally, the support portion 101 may be provided with the countersunk hole 5011, and the secondary handle 500 may be provided with a threaded hole. This is not limited in the present application.

One side of the secondary handle 500 is provided with a mounting groove 503. The support portion 101 can be insertable into the mounting groove 503. Thus, the secondary handle 500 and the support portion 101 are in sufficient contact to make the connection more stable.

A saw blade 200 is located on one side of the housing 100. To facilitate the mounting of the locking bolt 600, the countersunk hole 5011 is disposed on the side of the secondary handle 500 facing away from the saw blade 200 to prevent the saw blade 200 from interfering with the mounting of the locking bolt 600. The mounting groove 503 is disposed on the side of the secondary handle 500 facing away from the countersunk hole 5011 and communicates with the countersunk hole 5011.

Figure 14:
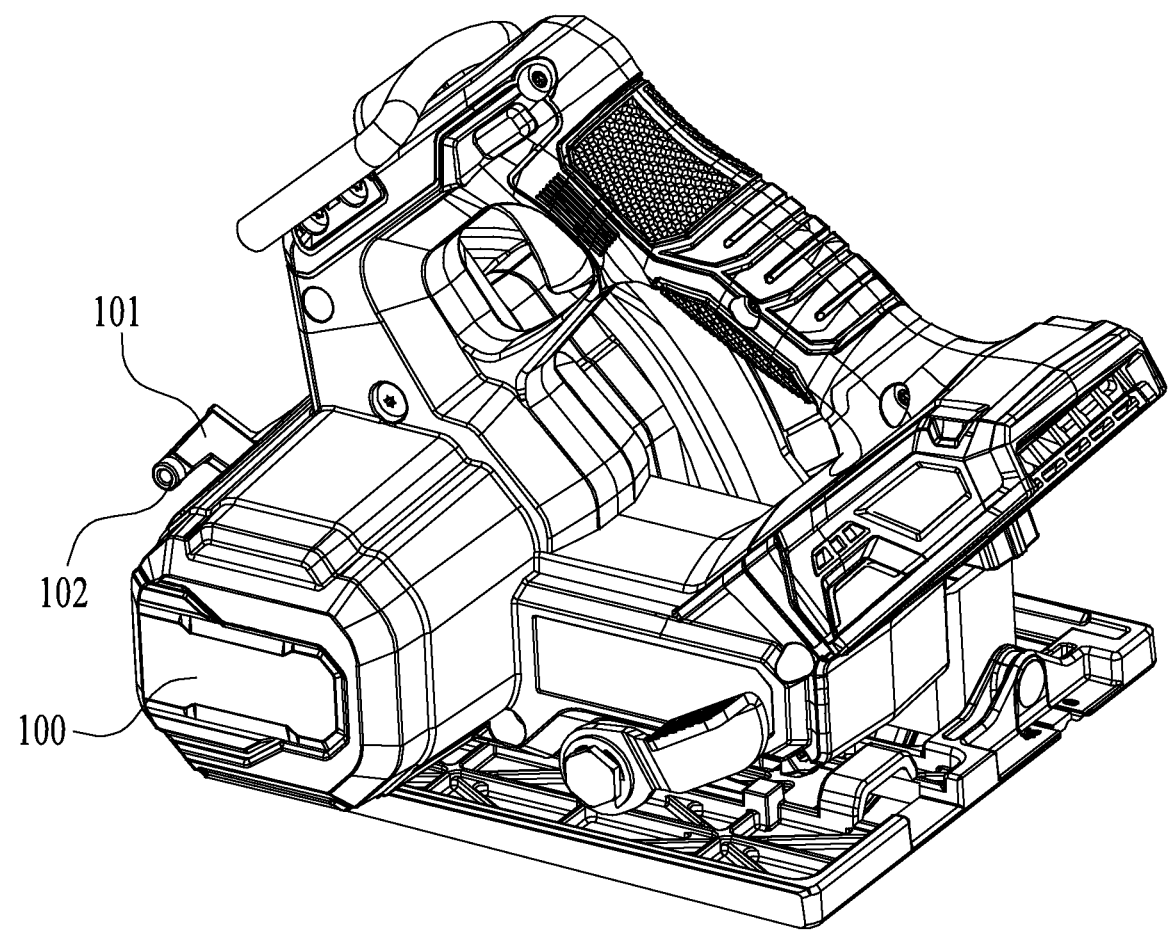
FIG. 14 is a partial view illustrating the structure of the circular saw of FIG. 13.
Figure 15:
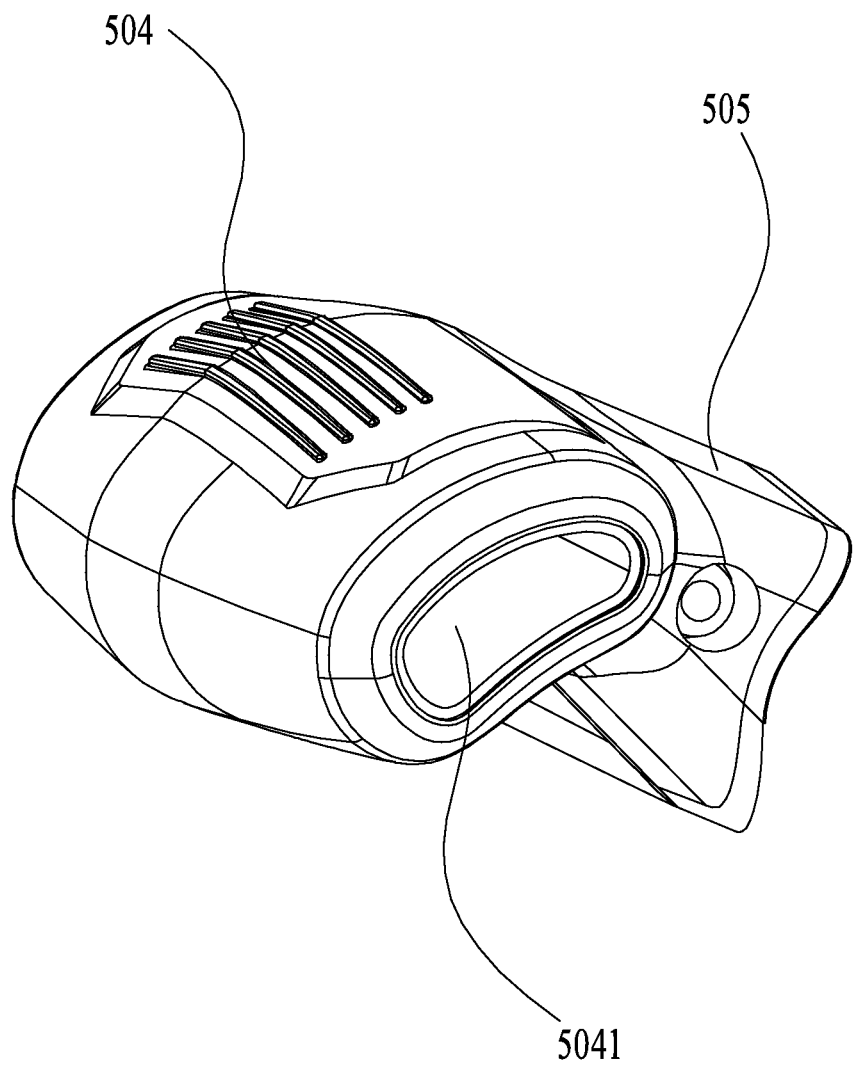
FIG. 15 is a view illustrating the structure of a secondary handle according to the example.
Figure 16:
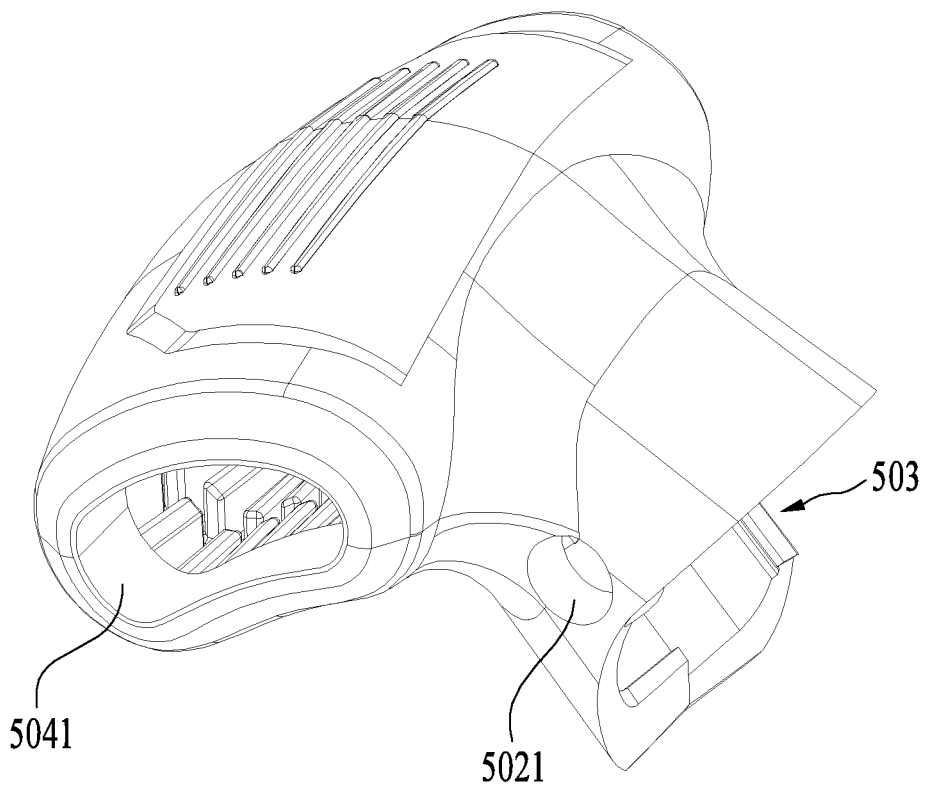
FIG. 16 is a view taken from one angle to illustrate the structure of an outer cover portion of the secondary handle according to the example.
Figure 17:
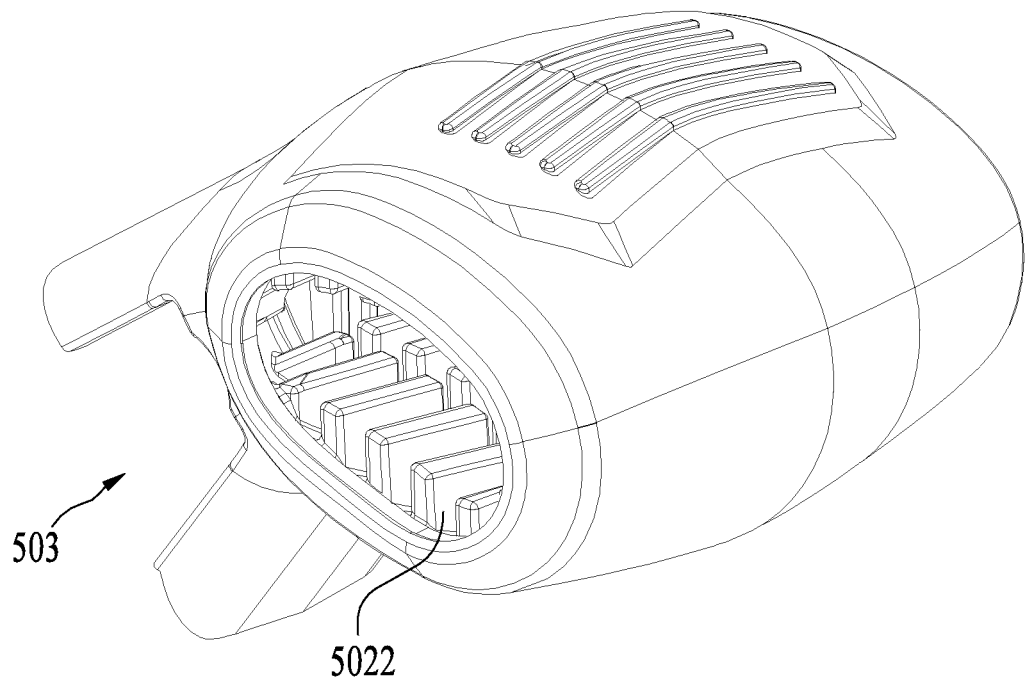
FIG. 17 is a view taken from another angle to illustrate the structure of the outer cover portion of the secondary handle according to the example.
Figure 18:
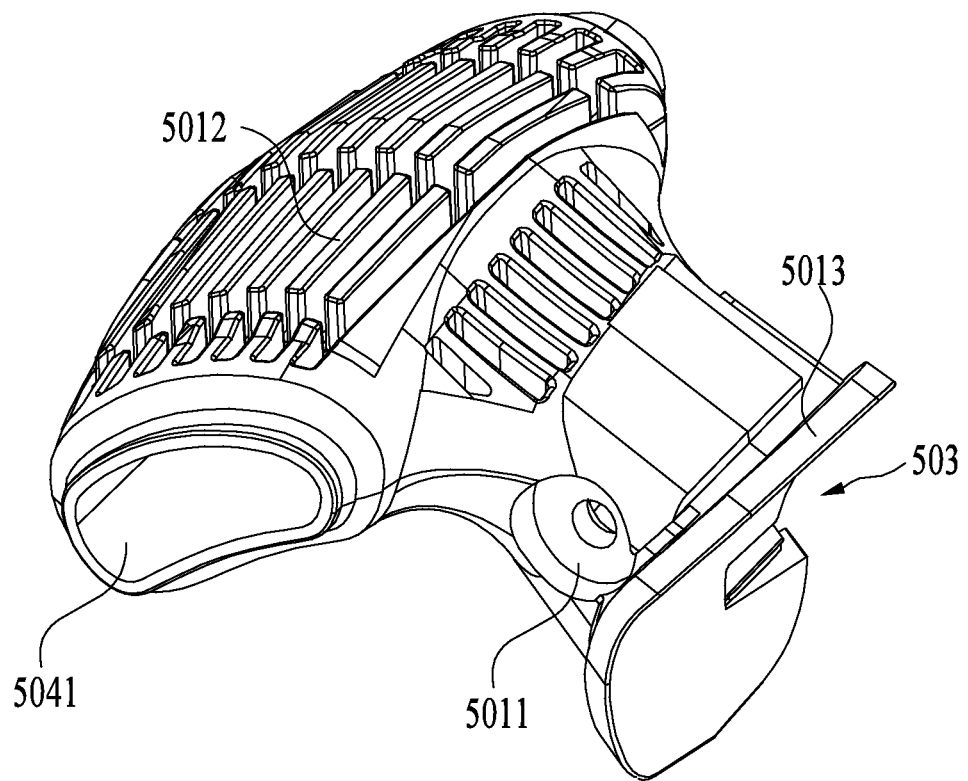
FIG. 18 is a view taken from one angle to illustrate the structure of a base portion of the secondary handle according to the example.
Figure 19:
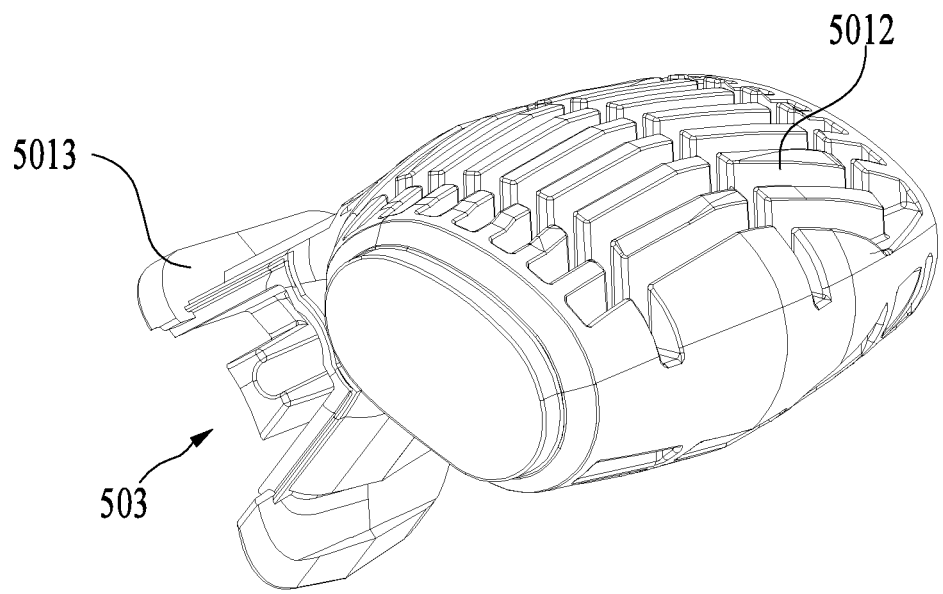
FIG. 19 is a view taken from another angle to illustrate the structure of the base portion of the secondary handle according to the example.

Referring to FIG. 14, the support portion 101 is L-shaped. One end of the support portion 101 is connected to the housing 100, and another end of the support portion 101 is provided with the threaded hole 102. Accordingly, the shape of the mounting groove 503 of the secondary handle 500 should be adapted to the shape of the support portion 101.

Referring to FIG. 13 and FIGS. 15 to 19, the secondary handle 500 includes a base portion 501 and an outer cover portion 502. The outer cover portion 502 is directly formed on the outer surface of the base portion 501 and covers the outer surface. In this manner, the base portion 501 is completely covered, and there is no crack. Thus, there is no problem of pinching hands, and a holding feel is good.

The hardness of the base portion 501 is greater than the hardness of the outer cover portion 502 to play a support role. The outer cover portion 502 is made of an elastic material to ensure a good handfeel. Specifically, the outer cover portion 502 may be soft rubber.

The shape of the outer cover portion 502 is the same as the shape of the base portion 501 substantially. The countersunk hole 5011 is disposed on the base portion 501. The outer cover portion 502 is provided with an avoidance hole 5021 at a position corresponding to the countersunk hole 5011 to enable the locking bolt 600 to extend through. The mounting groove 503 extends through the outer cover portion 502 and the base portion 501.

The outer cover portion 502 and the base portion 501 are integrally formed by injection molding to facilitate processing and production. In this manner, the secondary handle is an integrated structure, and the outer cover portion 502 does not shift relative to the base portion 501. Thus, a slip phenomenon does not occur during holding.

Optionally, the outer surface of the base portion 501 is provided with a plurality of grooves 5012. The inner surface of the outer cover portion 502 is provided with protrusions 5022 insertable into the grooves 5012. During the production of the outer cover portion 502, rubber is filled into a groove 5012 to form a protrusion 5022. The protrusions 5022 match with the grooves 5012. In this manner, there is a large contact area between the outer cover portion 502 and the base portion 501. Therefore, the connection between the outer cover portion 502 and the base portion 501 is more stable.

One end of the base portion 501 connected to the housing 100 is provided with an edge 5013. The margin of the outer cover portion 502 abuts against the edge 5013. The edge 5013 can serve as a stopper.

In this example, the secondary handle 500 is T-shaped to facilitate holding. Specifically, the secondary handle 500 has a grip portion 504 and a connection portion 505 that are vertically connected. The connection portion 505 is detachably connected to the housing 100. The connection portion 505 is provided with the countersunk hole 5011 and the mounting groove 503. The grip portion 504 is provided with a through cavity 5041 extending through two ends of the grip portion 504 to facilitate processing and production and to reduce the weight of the secondary handle 500. The through cavity 5041 extends through the base portion 501 and the outer cover portion 502 at the same time.

Optionally, the secondary handle 500 extends along an extension axis and away from the primary handle 400. The extension axis is disposed at an included angle with the center line of a motor shaft. The included angle between the extension axis and the center line of the motor shaft is greater than or equal to 0° and less than or equal to 20°. Further, the included angle between the extension axis and the center line of the motor shaft is greater than or equal to 5° and less than or equal to 10°. When the included angle between the extension axis and the center line of the motor shaft is configured to be 6°, the secondary handle 500 is more in accordance with an ergonomic principle to facilitate holding and to achieve an effort-saving effect. Specifically, the secondary handle 500 is inclined and extends upwards on the housing 100 in a direction facing away from a base plate 300, and the secondary handle 500 and the primary handle 400 extend towards two sides of the housing 100. Thus, the whole machine bears an even force during holding.

In conclusion, the base portion 501 of the secondary handle 500 may be integrally formed with the outer cover portion 502 of the secondary handle 500 through injection molding. The outer cover portion 502 is directly formed on the outer surface of the base portion 501 and covers the outer surface. In this manner, the base portion 501 is completely covered, and there is no crack. Thus, there is no problem of pinching hands, and the holding feel is good. The housing 100 and the support portion 101 are integrally formed. The processed secondary handle 500 may be connected to the support portion 101 through the locking bolt 600.

What is claimed is:

1. An electric circular saw, comprising:
a housing provided with an accommodation space;
a saw blade for cutting a workpiece;
a shield surrounding at least a portion of the saw blade;
a drive assembly, wherein at least part of the drive assembly is disposed in the accommodation space and the drive assembly is configured to drive the saw blade to rotate around a first axis;
a base plate for connecting the housing and the shield; and
a dust-blowing structure, wherein the dust-blowing structure comprises:
a wind-blowing assembly disposed on the drive assembly;
a dust-blowing portion disposed on the base plate; and
a wind guide portion disposed between the dust-blowing portion and the wind-blowing assembly;
wherein the dust-blowing portion comprises a flow guide hole and a flow guide groove disposed on the base plate, the flow guide hole is a through hole passing through the base plate, the flow guide groove is a groove disposed on a lower side of the base plate, and the flow guide hole communicates with the flow guide groove.

2. The electric circular saw according to claim 1, wherein the drive assembly comprises an electric motor and a gearbox and the gearbox is formed with an opening for the wind-blowing assembly to blow out a heat dissipation wind.

3. The electric circular saw according to claim 2, wherein the gearbox comprises a connection portion for connecting with the base plate and the wind guide portion is arranged on the connection portion.

4. The electric circular saw according to claim 2, wherein the wind guide portion is disposed at the opening and is formed with a guide rib for guiding the heat dissipation wind.

5. The electric circular saw according to claim 4, wherein the base plate comprises a base plate plane extending in a first plane, in a plane parallel to the first plane the guide rib extends substantially in a second straight line, in a plane perpendicular to the first axis the guide rib extends substantially in a third straight line, a straight line parallel to the first plane and perpendicular to the first axis is defined as a first straight line, the first straight line and the second straight line intersect and form an included angle α, the included angle α is greater than or equal to 5° and less than or equal to 50°, the first straight line and the third straight line intersect and form an included angle β, and the included angle β is greater than or equal to 5° and less than or equal to 50°.

6. The electric circular saw according to claim 1, wherein the base plate comprises a base plate plane extending in a first plane, the wind guide portion comprise a first guide surface and a second a second guide surface, a straight line parallel to the first plane and perpendicular to the first axis is defined as a first straight line, the first guide surface extends along a plane perpendicular to the base plate plane and intersecting the first straight line obliquely to form an included angle α, the included angle α is greater than or equal to 5° and less than or equal to 50°, the second guide surface extends along a plane parallel to the first axis and intersecting the first straight line obliquely to form the included angle β, and the included angle β is greater than or equal to 5° and less than or equal to 50°.

7. The electric circular saw according to claim 1, further comprising a guide portion for guiding a cut direction wherein at least a portion of the dust-blowing portion is disposed on a rear side of the guide portion.

8. The electric circular saw according to claim 7, wherein the guide portion is arranged at the base plate and the dust-blowing portion guides a heat dissipation wind to the guide portion or a front side of the guide portion.

9. The electric circular saw according to claim 8, wherein the guide portion is arranged at an upper surface of the base plate.

10. The electric circular saw according to claim 7, wherein the guide portion and the saw blade are both arranged in a straight line extending in a front-rear direction.

11. The electric circular saw according to claim 7, wherein the guide portion is disposed in a space where the flow guide groove is located.

12. The electric circular saw according to claim 7, wherein the base plate comprises a base plate plane extending in a first plane, the flow guide groove has a projection in the base plate plane, and the guide portion is disposed in the range of this projection.

13. The electric circular saw according to claim 1, wherein a width of the flow guide hole in a left-right direction is substantially the same as a width of the flow guide groove in the left-right direction.

14. The electric circular saw according to claim 1, wherein a depth of the flow guide groove in an up-down direction is greater than or equal to 0.5 mm and less than or equal to 5 mm.

15. The electric circular saw according to claim 1, further comprising a handle connected to the housing and comprising a primary handle and a secondary handle wherein the secondary handle is detachably connected to the housing, the secondary handle comprises a base portion and an outer cover portion, and the outer cover portion is directly formed on an outer surface of the base portion and covers the outer surface.

16. The electric circular saw according to claim 15, wherein the outer cover portion and the base portion are integrally formed by injection molding.

17. An electric circular saw, comprising:
a housing provided with an accommodation space;
a saw blade for cutting a workpiece;
a shield surrounding at least a portion of the saw blade;
a drive assembly, wherein at least part of the drive assembly is disposed in the accommodation space and the drive assembly is configured to drive the saw blade to rotate around a first axis;
a base plate for connecting the housing and the shield;
a guide portion for guiding a cut direction; and
a dust-blowing structure configured to blow a wind to the guide portion or a front side of the guide portion to blow away dust near the guide portion,
wherein the guide portion is arranged on an upper surface of the base plate, the dust-blowing structure comprises a flow guide hole and a flow guide groove disposed on the base plate, the flow guide hole is a through hole passing through the base plate, the flow guide groove is a groove disposed on a lower side of the base plate, and the flow guide hole communicates with the flow guide groove.

18. The electric circular saw according to claim 17, wherein a width of the flow guide hole in a left-right direction is substantially the same as a width of the flow guide groove in the left-right direction.

19. The electric circular saw according to claim 17, wherein the base plate comprises a base plate plane extending in a first plane, the flow guide groove has a projection in the base plate plane, and the guide portion is disposed in the range of this projection.

\* \* \* \* \*